United States Patent [19]

Valdespino

[11] 4,147,018
[45] Apr. 3, 1979

[54] ROTARY MOWER AND BLADE APPARATUS

[75] Inventor: Joseph M. Valdespino, Orlando, Fla.

[73] Assignee: Grassaw, Inc., Kansas City, Mo.

[21] Appl. No.: 748,514

[22] Filed: Dec. 8, 1976

[51] Int. Cl.$^2$ ............................................ A01D 55/18
[52] U.S. Cl. ...................................... 56/295; 30/276; 56/320.2
[58] Field of Search ...................... 56/295, 202, 320.2; 30/276, 347, DIG. 5

[56] References Cited

U.S. PATENT DOCUMENTS

| | | | |
|---|---|---|---|
| 2,787,881 | 4/1957 | McDaniel | 56/295 |
| 2,859,581 | 11/1958 | Kroll et al. | 56/295 |
| 2,910,818 | 11/1959 | Beal et al. | 56/202 |
| 3,059,400 | 10/1962 | Plummer | 56/295 |
| 3,096,608 | 7/1963 | Williamson | 56/295 |
| 3,505,798 | 4/1970 | Tubbs | 56/295 |
| 3,534,534 | 10/1970 | Raiti | 56/295 |
| 3,815,234 | 6/1974 | Nelson et al. | 56/295 |

FOREIGN PATENT DOCUMENTS 421417  3/1967  Switzerland .............................. 30/276

*Primary Examiner*—Jay N. Eskovitz
*Attorney, Agent, or Firm*—Duckworth, Hobby, Allen & Pettis

[57] ABSTRACT

A safety blade for a rotary mower along with a rotary mower is provided in which the rotary mower has a blade housing with an annular band mounted for rotation therein. The annular band has teeth encircling the edge and is connected to the drive shaft by supporting cross members. The annular band may extend vertically when attached to a mower, or may be angled inward towards the center; and may have a fixed or removable annular blade portion. The cross support members may have features for removing grass, and the mower housing may have an opening for the ejection of grass from the sides or the top of the housing.

16 Claims, 7 Drawing Figures

ROTARY MOWER AND BLADE APPARATUS

BACKGROUND OF THE INVENTION

The present invention relates to rotary lawn mowers and blades for rotary lawn mowers and especially to a safety blade having an improved cutting action for a rotary lawn mower.

In the past, a variety of rotary lawn mowers have been provided with various types of cutting blades. Typically, a rotary lawn mower has a single, elongated cutting blade attached to a rotary shaft and protected by a covering or housing with only the end portions having a sharpened edge, so that the fast rotation of the blade will cut the grass as the mower rolls over the grass. In addition, the blade will direct grass out a side opening in the lawn mower to a grass catcher. These types of blades have been satisfactory in that they have been inexpensive to manufacture, and easy to sharpen. However, they tend to become dull rapidly from the cutting of grass and from other collisions with sticks, rocks, and the like. The fast moving blade can drive a rock, or other solid objects, at a high velocity causing great damage to persons or property if not captured by the mower housing. Finally, a person's hand or foot getting under the housing or into the housing from the grass outlet can be severely injured if it comes in the path of the blade. These problems have resulted in great concern by manufacturers and safety groups because of the large number of injuries every year resulting from rotary mowers. In contrast to these prior art mowers, the present invention, advantageously, reduces the power required to operate a rotary blade lawn mower, while preventing the easy entry of a person's hand or foot, and at the same time, tends to spin objects, such as rocks, in place when hit by the rotary blade.

Typical prior art lawn mowers which provide improvements over the standard rotary lawn mower may be seen in U.S. Pat. No. 3,096,608, to Williamson, for a Safety Blade Assembly for Rotary Mowers, in which a standard, elongated cutting blade has a circular band attached to the end thereof to prevent the throwing of rocks from the rotary blade and to prevent the insertion of a hand or a foot into the rotating blade. U.S. Pat. No. 3,176,455, to Buchanan, for a Rotary Mower Blade and U.S. Pat. No. 2,898,725, to Roesel, for a Rotary Mower Cutting Blade Structure, and U.S. Pat. No. 3,621,642, to Leake, for a Rotary Head Cutter Assembly for Lawn Mowers, illustrate various types of lawn mowers and cutting blades, each having circular components, but with the blade portions extending horizontally from the blade supports. The Buchanan patent has an arbor saw-type blade, while the Leake patent has removable cutting elements and the Roesel patent has blades with a plurality of cutting edges which can be shifted between cutting positions. The U.S. Patent to Berry, U.S. Pat. No. 2,936,564, teaches a blade unit for rotary brush cutters in which a conventional, elongated blade has a pair of vertically extending blades with upper and lower cutting edges attached thereto in an arcuate pattern facing the direction of the rotation of the blade; and the Cummings U.S. Pat. No. 3,849,975, illustrates a cutting means employing an eccentric rotational cutting action having a pair of cutting edges acting on an eccentric pattern to provide a continuous cutting in the rotation of the blades.

SUMMARY OF THE INVENTION

The present invention provides a rotary mower, weed cutter, or the like, which has a blade housing for mounting a blade therein, along with an annular band having upper and lower edges, with the lower edge having a plurality of cutting teeth formed therein. An engine drives a rotating shaft to which the band support members are connected to support the annular band to the rotating shaft to drive the annular band for producing a cutting action when the band is passed over grass, or other materials. The band support members may have an arcuate portion to prevent the accumulation of grass, in addition to angled vanes formed therein to create a fan for driving the grass out through the blade housing opening which may be located on top of the blade housing. The annular blade may have a removable blade portion for replacing just the annular cutting portion, which may have a plurality of saw teeth formed therein, and may be bolted or otherwise attached to the annular band or to a spacing member attached to the band. The annular band may be cone-shaped with the band angled towards the center of the band.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
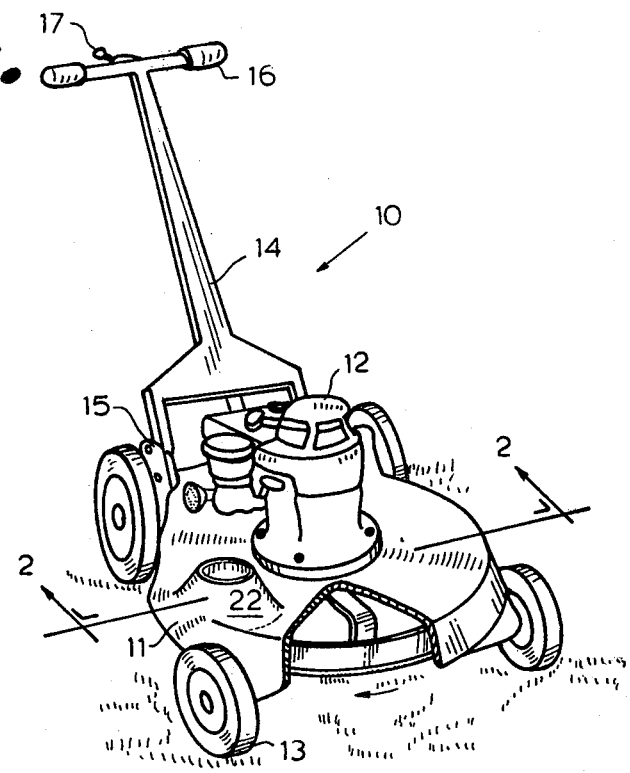
FIG. 1 is a perspective view of a lawn mower with sections cut away, in accordance with a preferred embodiment of the present invention.
Figure 2:
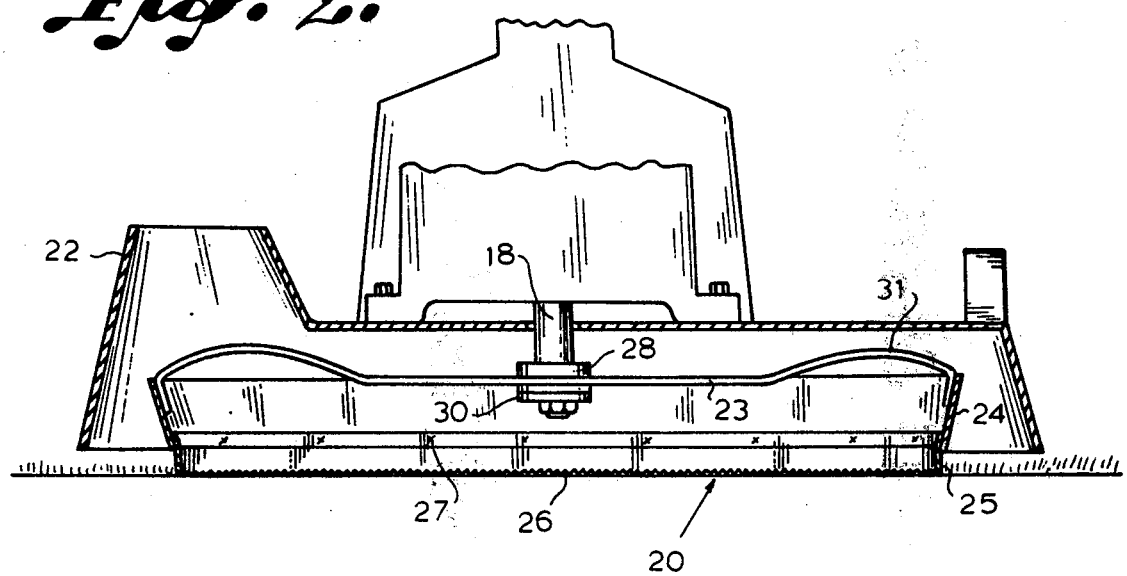
FIG. 2 is a sectional view taken along the line 2—2 of FIG. 1.

Referring now to FIGS. 1 and 2 of the drawings, a lawn mower 10 is illustrated having a blade housing 11 with an engine 12 mounted thereon and a plurality of wheels 13 supporting the housing 11 and engine 12. The housing 11 has a handle supporting framework 14 connected at 15 to the housing 11 and having a pair of handles 16 attached thereto for controlling the movement of the lawn mower 10. Control 17 allows the control of the motor adjacent the handle 16. The engine 12 has a direct shaft 18 protruding therefrom through the housing 11. Even though, it should be clear that the shaft 18 could be connected by means of a belt or other drive means to the engine 12. The shaft 18 has the blade assembly 20 attached thereto by a nut 21 bolted onto the shaft 18. The housing 18 differs from most lawn mower housings inasmuch as it has a cone or funnel-shaped leaf and grass outlet 22 located on top of the housing 11 rather than on a predetermined side. However, the design of the blade of the present lawn mower allows the opening 22 to be located in any of a variety of positions to position the grass catching bag out of the way of the edge of the lawn mower to allow mowing close to trees, fences, and obstructions. The blade assembly 20 has a plurality of cross members 23 connected to an annular band 24 which annular band is slanted in a cone-shaped manner in a direction towards the center of the band and which band 24 has annular cutting surface 25 having a plurality of saw teeth 26 encircling one edge of the band 24 cutting portion 25. The cutting portion 25 is attached to the band 24 by spot welds 27. The teeth 26 can be formed directly into a single band 24, if desired. The cross members 23 have an opening 28 in the middle thereof for the shaft 18 to pass through for attaching with the nut 21 and with locking washers 30 which washers may be added or deleted to adjust the height of the blade. The cross members 23 may have curved end portions 31 which curve upward and swing around to attach to the annular band 24 which curves to allow the escape of grass, leaves, and the like, from the inside of the band 24 for escape over the band 24 in the absence of an opening through the housing 11. The blade assembly 20 has the advantage of preventing a hand or foot from protruding into the cross members we either from a side grass catcher opening or from underneath the blade housing 20, and, in addition, small cutting teeth 26 on the annular cutting portion 25 of the band 24 have been shown to utilize less energy and thereby requires a smaller engine 12. The more efficient cutting surface also allows the cutting of much heavier, thicker grass than prior blades inasmuch as it is sawing in a uniform sawing action of the grass rather than with the force of a blade colliding at different angles of a standard rotary mower blade. The cutting action is believed to occur by the bending of the grass by both the housing 11 and the blade band 24 and cutting surface 25 to pass under the mower, and while bent to be cut off at the lowest position by the cutting teeth 26 and to be cutting the whole swath at once. An advantage of the rotary cutting action is that rocks, bottles, cans or any other foreign matter that collides with the blade assembly 20 is driven in a spinning manner within the protective band 24 rather than thrown with great force by a rotating arm with the risk of escaping from the housing 11. The spinning action continues to spin until it harmlessly stops and may by thrown upward and over the band 24 without damaging the blade or a person or property near the lawn mower.

Figure 3:
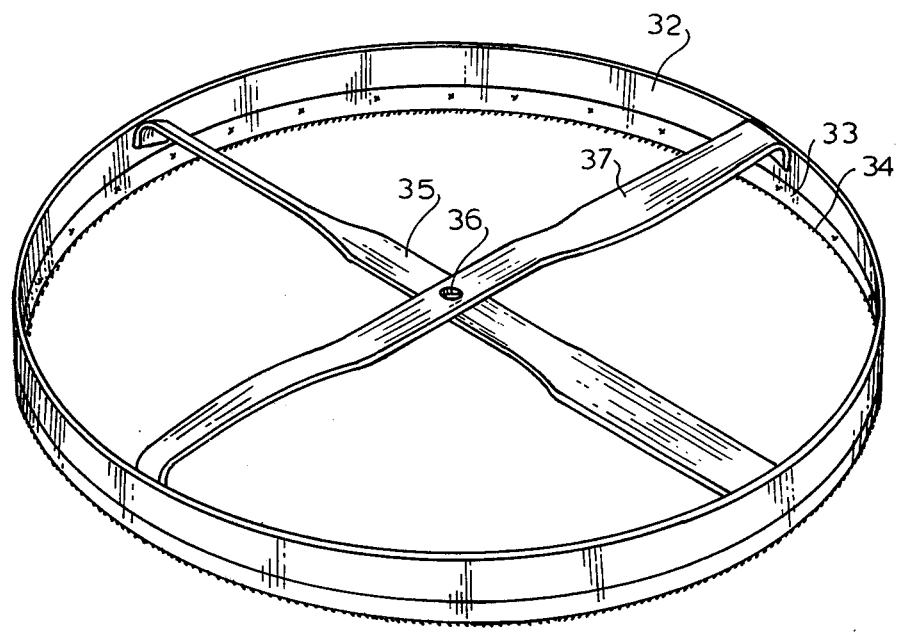
FIG. 3 is a perspective view of a second embodiment of a rotary blade in accordance with the present invention.
Figure 4:
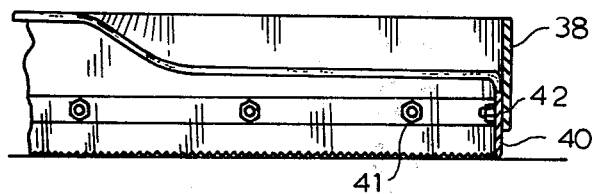
FIG. 4 is a sectional view of a third embodiment of the present invention.
Figure 5:
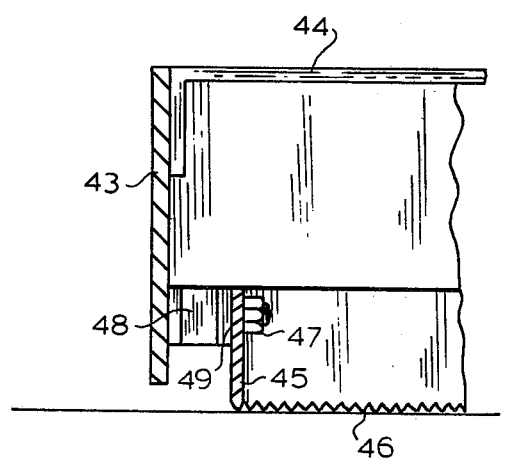
FIG. 5 is a sectional view of a fourth embodiment of the present invention.

Turning now to FIGS. 3, 4, and 5, alternate embodiments are shown in which a band extends straight up and down in a vertical direction rather than in an inwardly angled cone, and has a vertically extending cutting portion 33 having a plurality of saw teeth 34 on the edge thereof. Four cross members 35 on this embodiment are attached to the band 32 and have an opening 36 in the middle thereof. This embodiment further differs in that the cross members 35 have angled or turbine-shaped blades 37 which tend to cause a fan action which draws grass or other debris passing into the center of the band 32 in an upward direction where it can be directed out of an opening 22 in a housing 11. In the absence of the opening 22, the fan blades 37 will direct the material against the top of the blade housing 11 and over the top of the band 32 where it can be deposited in the top of the area being mowed. This action has the advantage of directing potential objects that could be thrown by a rotating arm in a manner that they utilize their energy and are directed over the band and down against the earth. This action is accomplished by the twisting of the cross members 35 at predetermined locations into any shape desired, but a simple angle has been shown to perform the necessary action of directing material from the lawn mower.

Another embodiment as illustrated in FIG. 4 in which an annular band 38, which is illustrated in a vertically extending direction, has a vertically extending annular cutting portion 40 which is removably attached to the band 38 by means of bolts 41 which are formed onto the band 38 and extend therefrom. The bolts 42 do not extend through the band 38 so that band 38 provides a smooth surface to one's hand or foot if it is pushed against the band 38, so as to avoid injury to the individual. The removable blade portion 40 may be attached to the band 38 in any manner desired without departing from the spirit and scope of the invention.

FIG. 5 illustrates yet another embodiment in which the annular band 43 is connected by cross members 44 to the lawn mower and has an annular cutting blade portion 45 having a plurality of saw teeth 46 extending around the entire edge surface of the cutting band 45. In this embodiment, the cutting band 45 is removably attached with bolts and nuts 47 to a spacer member 48 which may be spot welded or otherwise attached to the band 43. This allows a small spacing between the cutting teeth 46 and the band 43 to further isolate the cutting teeth from harm to an individual while allowing an additional band 43 to bend the grass or weeds being cut just prior to contact with the cutting teeth 46 of the cutting band 45.

Figure 6:
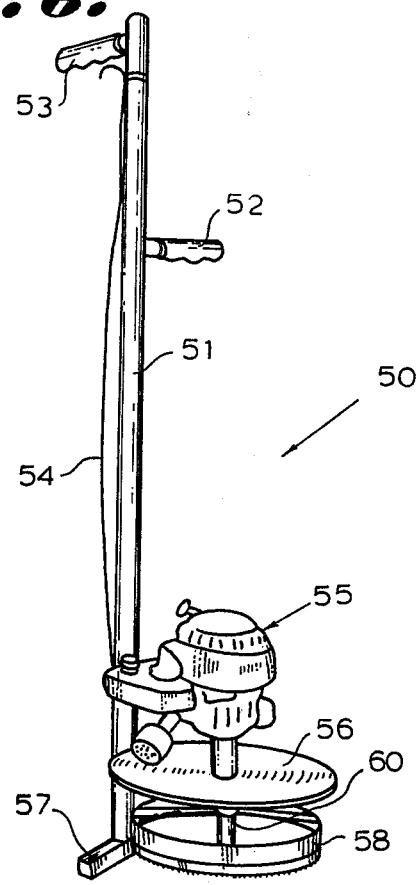
FIG. 6 is a perspective view of the hand-held cutting unit utilizing the blade in accordance with the present invention.
Figure 7:
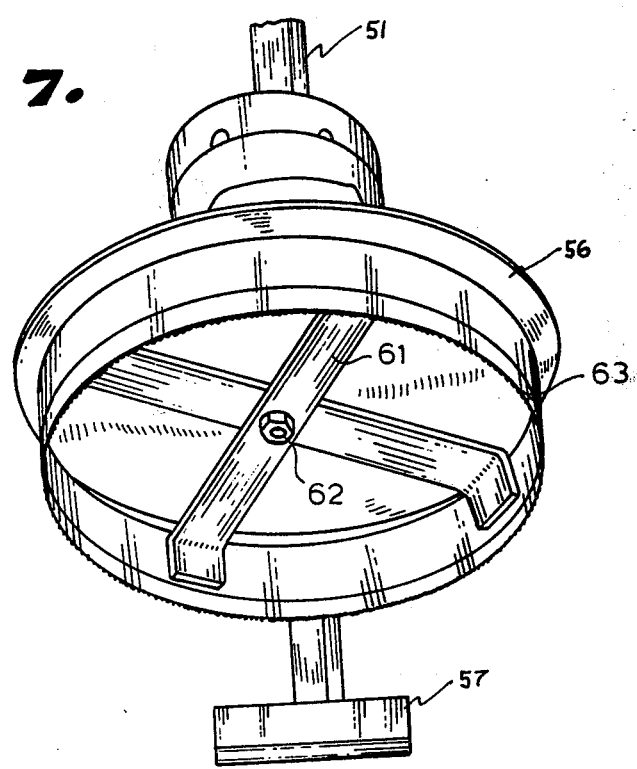
FIG. 7 is a perspective view of the blade and guard portion of the cutter of FIG. 6.

Referring now to FIGS. 6 and 7, an alternate embodiment of a hand held cutter assembly 50 is illustrated having a shaft 51 having a pair of handles 52 and 53 for supporting by an individual attached to the shaft 51 with a control line 54 extending from the handle 53 to the engine 55. The engine 55 is supported to the shaft 51 and has a guard shroud 56 attached thereto to prevent rocks from being directed up towards the operator. A ground support member 57 is attached to the bottom of the shaft 51 for supporting the shaft 51 upon the ground when the blade is not being operated by the user. An annular band 58 is attached to the motor engine shaft 60 by a plurality of cross members 61 which are connected by a nut 62. The annular band 58 has a plurality of cutting teeth 63 of a small saw-tooth variety attached along its annular edge for the 360° circle. In operation, the cutter in FIGS. 6 and 7 can be held by the handles 52 and 53 after the engine 55 is started, and then moved around to cut very high grass or brush, by an operator while utilizing only a relatively small engine 55 because of the increased efficiency of the cutting action. The shroud 56 can be extended over the side of the blade, if desired, for additional safety.

It should be made clear that the present invention can be made of any material desired with different sized engines as desired, but typically, a blade housing will be made of steel, or the like, while the annular band can be formed of a high strength steel. The cutting bands and cutting teeth, which may be hardened, if desired, may also be made of steel. However, it should also be realized that the cutting teeth and cutting bands can be made of a high strength ploymer material, which can be easily and inexpensively replaced in those embodiments in which it is removably attached to the safety bands. Accordingly, the present invention should not be construed as limited to the particular forms illustrated herein, which are to be considered illustrative rather than restrictive.

I claim:

1. A safety rotary mower, or the like, comprising in combination:
   a blade housing;
   an annular band having inner and outer surfaces and upper and lower edges, said outer surface being a generally smooth continuous surface and said lower edge having a plurality of generally vertically extending cutting teeth mounted there on and spaced circumferentially around said annular band to form a blade portion;
   drive means for rotating said annular band, and having a shaft extending into said blade housing;
   band support members connected to said band and to said drive means whereby said annular band acts as a shield and a cutting blade; and
   means for directing grass cut by said cutting teeth from said blade housing.

2. The apparatus in accordance with claim 1, in which a plurality of cutting teeth are formed in the lower edge of said annular band.

3. The apparatus in accordance with claim 1, in which said annular band plurality of cutting teeth are formed on a separate circular band, removably mounted to said annular band.

4. The apparatus in accordance with claim 3, in which said removably mounted circular band is removably attached with threaded members, bolting said circular band to said annular band.

5. The apparatus in accordance with claim 1, in which said band support members are cross members extending diametrically from one side of said band to the other, and having an opening therein for connection to said drive means.

6. The apparatus in accordance with claim 5, in which said cross members extend horizontally and have an upwardly extending curve therein, at each end portion thereof prior to being fixedly connected to the inside of said annular band.

7. The apparatus in accordance with claim 6, in which a pair of cross members intersect on the center thereof, and support said annular band.

8. The apparatus in accordance with claim 1, in which said blade housing has a generally cone-shaped passageway leading from the top of said housing and formed in said housing for removing grass, or the like, from said housing.

9. The apparatus in accordance with claim 8, in which means for directing cut grass from said blade housing includes vanes formed on said band support members to direct grass, or the like, through said housing opening.

10. The apparatus in accordance with claim 1, in which said annular band has a narrow truncated cone shape, angled from the upper to the lower edges thereby extending inwardly towards the center of said annular band.

11. The apparatus in accordance with claim 10 in which said annular band has an annular cutting portion having teeth formed therein protruding vertically from said cone shaped annular band.

12. A safety blade, for a rotary mower, or the like, comprising in combination:
   a circular band;
   support members connected to and supporting said band, said support members extending generally perpendicular to said band;
   connecting means for connecting said support members to a lawn mower, or the like;
   an annular blade attached to said circular band, and supported thereby, said annular blade having a plurality of cutting teeth formed in one edge thereof whereby said safety blade has an annular blade with vertically extending cutting teeth; and
   said annular blade being attached with spacers to be spaced inside said circular band to form an inner annular cutting blade and an outer safety band.

13. The apparatus in accordance with claim 12, in which said annular blade is removably attached to said spacers connected by said outer circular band.

14. The apparatus in accordance with claim 12 in which said circular band is a truncated, cone-shaped annular band, angled inward from an upper edge to a lower edge.

15. The safety blade in accordance with claim 12, in which said support members have vanes formed therein to produce a lifting action for directing grass, or the like, from inside said circular band.

16. The safety blade in accordance with claim 12, in which said support members have curved sections therein.

* * * * *